Figure 1:
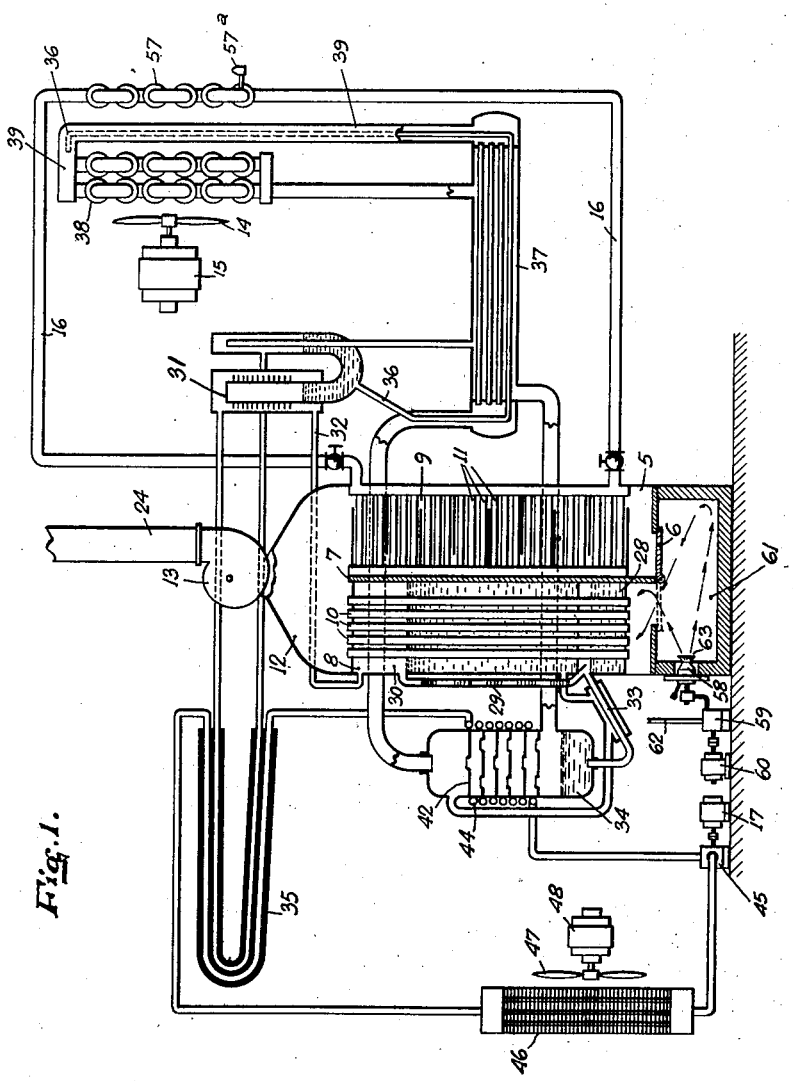

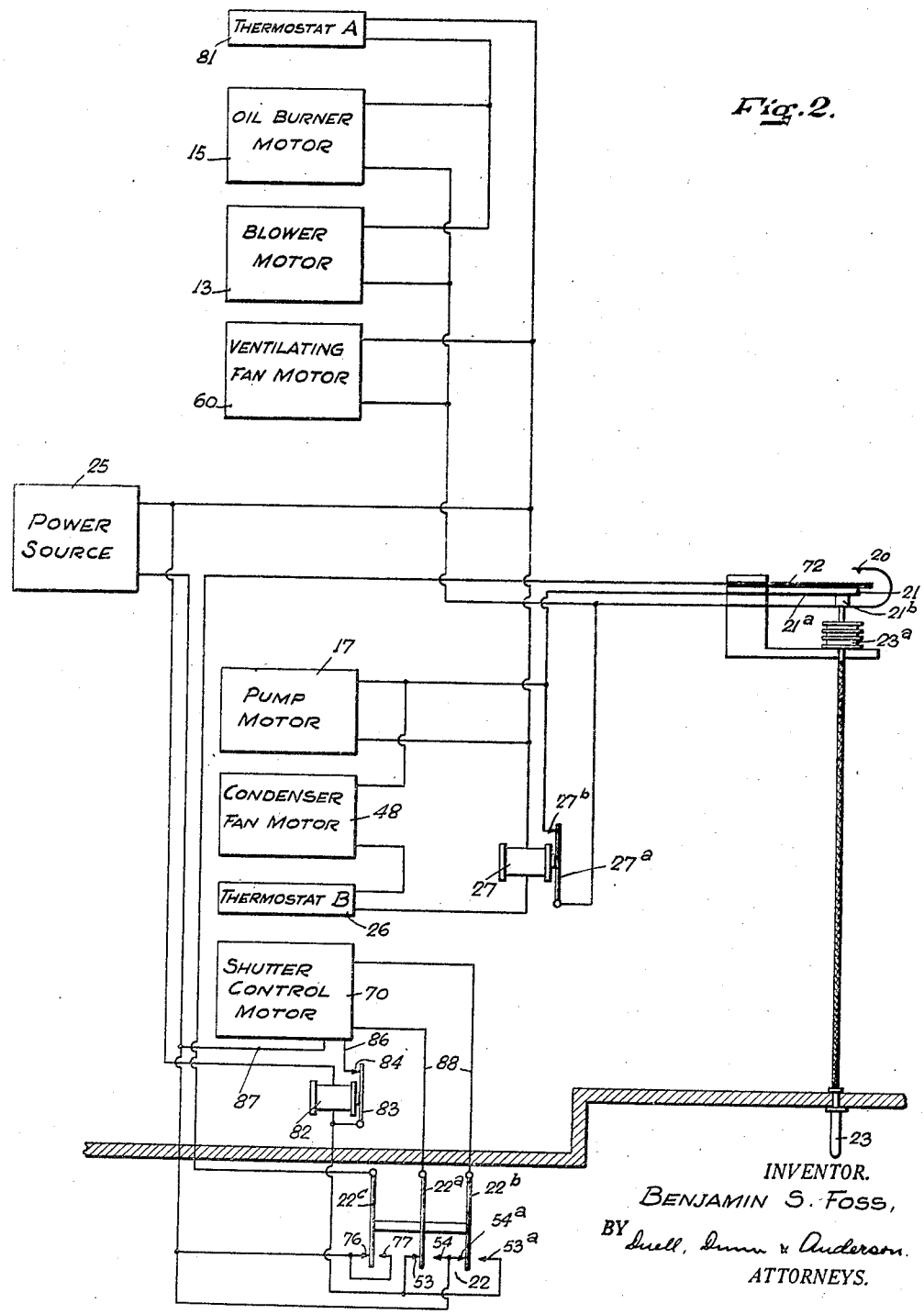

Patented Nov. 27, 1934

1,981,952

UNITED STATES PATENT OFFICE 1,981,952

AIR CONDITIONING SYSTEM

Benjamin S. Foss, Brookline, Mass., assignor to B. F. Sturtevant Company, Boston, Mass.

Application March 23, 1934, Serial No. 716,932

8 Claims. (Cl. 257—8)

This invention relates to the conditioning of air and relates more particularly to methods and apparatus for the heating or cooling of air within small buildings, such for example as private residences which heretofore have been equipped only with heating plants.

This application is a continuation in part of my co-pending application Serial No. 703,052, filed December 19, 1933.

While practically all small buildings, such as residences, for example, have been equipped in the past with heating plants employing steam, hot water or warm air as the heating medium, the first cost and operating expense of apparatus for the cooling of air for small buildings has heretofore been far too great. As a result, but few air conditioning systems for cooling of air in summer have been installed in such buildings. Many air cooling systems for small buildings utilizing mechanical refrigeration with refrigerant compressors, ice systems where blocks of ice are delivered from time to time, systems employing hygroscopic dehydration agents such as silica gel and calcium chloride, have been proposed and experimented with, but in every instance the cost of supplying the necessary cooling effect has been too great for practical purposes.

According to this invention, a modified heating plant is arranged to provide, at low first cost and with low operating expense, the necessary cooling effect for air conditioning in summer. The modern household heating plant is relatively efficient for heating purposes and represents a substantial investment, and, furthermore, has the advantage of being completely automatic. Take, for example, one of the better oil burner installations. The fuel is relatively inexpensive, the equipment in operation is completely automatic, it only being necessary to replenish the fuel oil supply from time to time. Yet, in spite of the substantial investment represented by such heating equipment, it is in service but a few months out of the year, except for such minor use as the supply of domestic hot water.

Recently studies were made of an air conditioning installation employing an oil burning, steam boiler for supplying heat to steam coils. It developed that the major portion of the heating equipment could be used for supplying the desired cooling effect in summer by combining the steam boiler with an absorption type refrigeration plant, a single oil burner being used and a common combustion chamber being employed for supplying flue gases in winter to the steam generator for heating purposes and to an absorption refrigeration generator in summer for cooling purposes. The cost of the necessary additional equipment was found to be but a fraction of the cost of the heating plant already installed, and the estimated performance of the complete plant indicated that the necessary cooling effect for summer could be provided at relatively low expense since automatic controls were available for adapting automatically the plant for heating or cooling purposes.

In one embodiment of this invention, a single oil burner, in cooperation with a single combustion chamber, supplies flue gases to a plurality of fire tubes comprising the generator of an absorption refrigeration plant, or alternatively to the water tubes of an ordinary steam boiler, the supply of flue gases to the refrigeration generator or to the steam boiler, together with the necessary auxiliary equipment, being completely under automatic control responsive to indoor and outdoor thermostats. It is intended that the conditioned air be supplied through ducts and that two sets of extended surface coils, one through which the refrigerant is circulated and the other through which steam or hot water is circulated, be placed within the air supply to the ducts and to be served by a ventilating fan for providing cold air in summer and warm and humidified air in winter.

An object of this invention is to supply cold air in summer and warm and humidified air in winter from a central plant.

Another object of the invention is to provide refrigeration or heating through the use of a single source of flue gases.

Another object of the invention is to combine, in an air conditioning unit, heat producing and cold producing equipment.

Another object of the invention is to provide in a single unit a fire tube absorption refrigeration assembly and a steam or hot water heating assembly.

Another object of the invention is to provide an absorption refrigration plant operated by the exhaust gases of an oil burner.

Another object of the invention is to provide an absorption refrigration plant and a heating plant to be alternatively operated together with automatic controls for cooling or heating purposes as desired.

Other objects of the invention will be apparent from the following description and explanation taken together with the drawings.

With reference to the drawings,

Fig. 1 is a partial diagrammatic and partial structural view of a combined heating and cooling system according to this invention, and Fig. 2 is a diagrammatic illustration of automatic controls for operating the equipment of Fig. 1.

The combined heating and cooling unit indicated generally by 5 comprises the single combustion chamber 61, which is supplied with heated flue gases, for example by the oil burner 58, or any other suitable source of flue gases. The oil burner comprises the electric motor 60, the pump 59 which is supplied with fuel oil from a storage tank through the supply pipe 62, and the atomizing nozzles 63 through which a spray of fuel oil is projected to be burned and converted into flue gases within the combustion chamber 61.

The combustion chamber 61 is equipped with the shutter 6 which is pivoted to a central insulating partition 7, which separates the fire tube absorption refrigeration plant 8 and the water tube heating plant 9. The shutter 6 may be placed, as shown, to cause all of the flue gases to pass through the plurality of fire tubes 10, or past the water tubes 11 in the heating plant 9. The flue gases, after passing through the fire tubes 10 or past the water tubes 11, enter the exhaust chamber 12 and are drawn into the mechanical draft fan 13 and are exhausted through the stack 24.

When the equipment is operated to supply the desired cooling effect, the shutter 6 is set to close off the flow of flue gases through the heating plant and is arranged to open the path through fire tubes 10 of the refrigeration plant. Surrounding the fire tubes 10 is the sub-generator 28 which contains ammonia or any other suitable refrigerant. The heat given off by the flue gases to the lower portion of the tubes 10 causes ammonia vapor to be driven off from the ammonia which, together with small slugs of ammonia, is raised together to the pump pipe 29 and to the generator 30. The ammonia vapor passes from the generator 30 through the rectifier 31, where any water vapor entrained with the ammonia vapor is condensed. The water formed by condensation absorbs ammonia vapor, so that an ammonia solution of strong concentration is returned to the generator through the pipe 32. The ammonia remaining in the generator having been reduced in concentration, the weak liquid settled to the bottom of the generator, and, because of the difference in level and also in pressure, is forced through the heat exchanger 33 into the top of the absorber 34.

The ammonia vapor leaves the rectifier 31 and passes through the condenser 35, where the cooling water, circulated in heat exchange relationship through the condenser, causes the vapor to liquefy. In the liquid state, the ammonia flows from the rectifier 31 through the pipe 36, which passes through the lower part of the gas heat exchanger 37 and discharges the liquid ammonia into the top of the evaporator coils 38.

Hydrogen gas enters the top of the evaporator coils 38 through the tube 39 and mixes with the ammonia vapor, causing, by Dalton's law of partial pressures, a low temperature within the evaporator coils. The evaporator coils in this case are extended surface coils and are so arranged with respect to the fan 14, driven by motor 15, and to the air ducts of the air conditioning system, that mixed outside and recirculated air is forced by the fan over the coils and into air distribution ducts from which it is discharged within the space to be served to provide the necessary cooling effect.

The mechanical mixture of hydrogen gas and ammonia vapor, after passing through the gas heat exchanger 37, enters the bottom of the absorber 34, through the tube 41. A flow of weak solution returns from the generator through the heat exchanger 33 and contacts with the ammonia and hydrogen gas mixture entering the absorber 34. The weak ammonia liquid passes over trays 42 in the absorber and absorbs ammonia vapor, causing the strength of the solution to increase. The stronger liquid accumulates at the bottom of the absorber and is returned by gravity to the sub-generator 28. The hydrogen passes through the tube 43 from the absorber to the gas heat exchanger 37.

Cooling water for the condenser 35 and also for the cooling coils 44, which are placed around the absorber 34, is provided by a pump 45, driven by motor 17, from the radiator 46. It is preferred that the radiator 46 be placed in a shady place out-of-doors, where it may be in contact with the coolest air available. Water in the radiator is cooled by the action of the fan 47, driven by the motor 48. If desired, a cooling tower may be provided in the place of the radiator 46 for cooling the condenser water.

In cool weather, when it is necessary to supply warm and humidified air to the space being served rather than cold air, the shutter 6 is operated to close off the path of the flue gases through the fire tubes 10 and to open the path of these flue gases past the water tubes 11 in the heating plant 9. When this is done, the flue gases heat the water to produce steam, if a steam heating system is preferred, or to produce hot water, if a hot water heating system is preferred, the steam or hot water passing through the pipe 16, and the extended surface coils 57, which are placed in the path of the mixed outside and recirculated air, which is forced by the fan 14 through the air distribution ducts. The humidifier 57a is provided to add the necessary moisture for maintaining the desired relative humidity.

Believing that the success of the combined heating and cooling plant that has been described would depend partially upon its operating without the necessity of manual control, the thermostatic control system illustrated by Fig. 2 was designed. The control is completely automatic and responds to combined outdoor and indoor temperatures. It is realized that desirable indoor temperatures depend to a large extent upon outdoor temperatures, and experience has shown that for every range of outdoor temperatures commonly encountered, a corresponding range of indoor temperatures is desirable for comfort purposes. Accordingly, the controls according to this invention have been designed to vary the temperatures called for by the indoor thermostat as outdoor changes take place. With the present arrangement, the outdoor thermostat determines whether or not the heating or cooling equipment shall be operated, and also determines the proper temperatures to be called for by an indoor thermostat. The indoor thermostat then functions to vary the heating effect or cooling effect, whichever may be in operation at the moment, to provide the desired indoor temperature.

The shutter 6 of Fig. 1, which controls the path of the flue gases, is moved under thermostatic control to assume the position shown in full lines by Fig. 1, where cooling is desired, and to assume the position shown by the dotted lines of Fig. 1, where heating is desired. This shutter motor and its associated mechanism, illustrated diagrammatically by Fig. 2, may be of the well known type manufactured by the Direct Control Valve Company of New York city. It is sufficient to state that the motor 70 is reversible so that, when the thermostat calls for cooling, the motor rotates in one direction to force the shutter 6 to the position of the full lines shown by Fig. 1, and, when heating is required, the motor reverses its direction and forces the shutter 6 to the position of the dotted lines of Fig. 1.

The shutter control motor 70 is controlled by the master thermostat 22, which determines whether or not the system shall supply refrigeration or heat to the coils in the air supply ducts. As shown by Fig. 2, the motor has four supply leads leading to it, these leads supplying current to armature and field of the motor. The thermostat 22 provides current of one direction to the armature of the motor when heat is required by the system and the motor is to rotate in a direction to route the flue gases through the heating system, and to, at the same time, close off the path of the flue gases through the refrigeration system. Likewise, when a cooling effect is required, the thermostat reverses the current flow to the armature of the motor to cause it to change its direction and route the flue gases through the refrigeration system, and to, at the same time, close off the path of the flue gases through the heating system.

The master control thermostat 22 is located preferably out-of-doors and so is the bulb 23 of the indoor thermostat, the bi-metallic strip of which is indicated by 72. This indoor thermostat is preferably located in a convenient location within the space to be served by the conditioned air. The master control 22 not only determines whether heating or cooling shall be supplied by controlling the position of the flue gas shutter 6, but its contacts are included in the circuit with contacts of the indoor thermostat in order that the indoor thermostat may only turn on or shut off the supply of heat or cold as outdoor conditions require.

The oil burner operating motor 15 and blower motor 13 will be in operation whenever heat or cold is called for, and the ventilating fan motor 60 will be energized whenever heat or cold is called for by the system, these latter motors being de-energized by the indoor thermostat when the indoor temperature is within the proper range.

The condenser fan motor 48 and pump motor 17 are energized so long as the system calls for refrigeration, and are de-energized when the indoor temperatures are within the desired range.

The master thermostat comprises the two thermostatic elements 22a and 22b, which perform the function of a double-pole, double-throw switch to reverse the current flow from the power source 27 to the armature of shutter control motor 70. In the position shown by Fig. 2 of the drawings, the thermostat element 22a rests against the contact 53 and the thermostatic element 22b rests against the contact 54a. The current in one direction flows through leads 88 to the armature of the control motor 70 to cause its associated shutter 6 to assume the position shown by Fig. 1 of the drawings, in which position the flue gases are routed through the absorption refrigeration unit.

The thermostatic elements of this master switch are so biased as to cause it to assume the position shown by Fig. 2 of the drawings, when outdoor temperature is, for example, at 85° F. or above. The thermostatic elements are also biased to reverse the current flow through the shutter motor 70 and to cause the shutter to assume the position shown by the dotted lines of Fig. 1 so as to route the flue gases through the heating unit when the outdoor temperature falls, for example, below 70°. When this is done, the thermostatic element 22a rests against the contact 54 and the thermostatic element 22b rests against the contact 53a, this causing a current reversal to the armature of the shutter motor 70, causing it, as has previously been explained, to switch the shutter 6 from cooling to heating position.

The pair of wires 88 represent the connections to the armature of the shutter motor 70 and the wires 86 and 87 represent the circuit to the field of the motor. The field circuit is completed through the relay 82, this relay being energized by the completion of the armature circuit when the thermostat 22 functions, the circuit being closed through one or the other of the thermostatic elements 22a or 22b, the winding leading to the armature 83, contact 84, and the leads 86 and 87. The shutter control motor of the armature is of the shunt type where reversal of either the field or armature causes reversal of rotation of the motor. Thus, the thermostat reverses the flow only of the armature current.

The master thermostat 22 has associated with the armatures 22a and 22b a third armature 22c which controls the circuits to be energized by the indoor thermostat. When the outdoor temperatures are between 70 and 85°, so that the thermostat 22 does not call for either hot or cold, the thermostat element 22c is between the two contacts 76 and 77. The contact 77 is connected in the circuit between the power source and the heating apparatus, and the contact 76 is connected in the circuit between the power source and the cooling apparatus. Therefore, with the thermostat element 22c between these contacts, no current can flow from the power source to the air conditioning apparatus regardless of the position of the indoor thermostat. Under ordinary conditions, the indoor thermostat and outdoor thermostat will not tend to conflict, so to speak, since, as will be explained later, the indoor thermostat is biased to conform to outdoor conditions. This thermostat element 22c and its contacts 76 and 77 are provided to prevent, under unusual circumstances, the indoor thermostat from calling for cold or heat while the outdoor thermostat has not acted to switch the shutter 6 from heating position, or cooling position respectively.

In the positions shown by Fig. 2 of the drawings, both the outdoor and indoor thermostats are in position to cause the supply of refrigeration to the air conditioning coils. As has previously been explained, the thermostat elements 22a and 22b of the outdoor master thermostat 22 have caused the shutter control motor to place the shutter 6 in the position shown by Fig. 1 of the drawings, to route the flue gases through the absorption refrigeration tubes. The thermostat element 22c rests against the contact 76 which is in circuit with power source 25, contact 21, thermostat element 72 of the indoor thermostat, the condenser fan motor 48, the pump motor 17, the thermostat 26, and the relay 27. The power source thus energizes the condenser fan motor and pump and relay. The energization of the relay causes it to pull up its armature 27a against the contact 27b, and this closes the circuit from the power source through armature 27a, contact 27b, ventilating fan motor 60, and the circuit including the blower motor 13, the oil burner motor 15, and the thermostat 81. Thus, the oil burner, blower, and fan motors are energized to play their part for the supply of refrigeration in the air conditioning coils.

The thermostat 26, which is in series relation to condenser motor 28, is in contact with the condenser motor water and serves the purpose of shutting down the fan motor when the temperature of the condenser water falls below a predetermined point.

The thermostat 81 is in series relation with the oil burner motor 15 and blower motor 13. This thermostat is in contact with the refrigerant in the generator of the absorption refrigeration plant and acts to open the circuit of the oil burner and blower motors when the refrigerant boils. This is standard practice in absorption systems of this kind.

When the temperature within the space being served falls to a temperature within the range desired, the thermostat strip 72 of the indoor thermostat moves to mid-position between the contacts 20 and 21, this causing the circuits of all the motors for the supply of refrigeration to be de-energized by the indoor thermostat, thus shutting down these motors and the supply of refrigeration.

When the temperature within the space being served becomes too low, the thermostat strip 72 will move against contact 20, causing the circuit including strip 22, contact 24, power source 25, blower motor 13, fan motor 60, and oil burner motor 15, to be energized provided, of course, the outdoor thermostat has acted to switch the damper 6 from cooling to heating position, in which event the outdoor thermostat element 22c will have moved against contact 77, thus completing the above described circuit to the power source 25.

The indoor thermostat is biased to respond within limits to the outdoor temperatures. This is accomplished through the accordion-like bellows 23a, mounted within the space being served and in contact directly with the arm on which the contact 20 is mounted and with the arm on which the contact 21 is mounted by means of the spacing block 21b. The bellows is fed with mercury by the mercury bulb 23, which is mounted out-of-doors. As outdoor temperature changes take place, the mercury in the thermostat 23 rises, causing the bellows 23a to expand and so move the contact 20 further away from, and the contact 21 nearer, the thermostat element 32. In adjusting this device for operation, the thermostat 23 may be exposed to the maximum temperature at which it is desired to have the control affected. This may normally be, for example, approximately 110° F. The springs confining the bellows and resisting the expansion thereof are then adjusted until no further expansion of the bellows is possible, even though the outdoor temperature should rise above 110°. The thermostat 23 can then be exposed to the minimum temperature under which it is desired to have the control operate. This may be 80°. The bellows 23a is then adjusted so that further decrease in outdoor temperatures and any further contraction of the bellows will not lower the contact arms 17 and 21a any further than they are lowered by the outdoor temperature of 80°.

It is preferred that at 80° F. and above, the indoor thermostat be adjusted to cause it to respond to indoor temperatures varying from 75° to 85° during the outdoor ranges of from 80° to 110°. The adjustment ceases at 110° upper level and at 80° lower level. So, even though the outdoor temperature drops to as low as 0°, the indoor thermostat is not influenced by outdoor conditions to call for a temperature lower than approximately 75°. Likewise, if the outdoor temperature should increase above 110°, the indoor thermostat is prevented from calling for a temperature above approximately 85°.

While the apparatus has been described as being completely automatic, since it is believed that this is preferable, it should be understood, of course, that the apparatus can be operated manually or by automatic controls other than those disclosed herein.

While the heating tubes in contact with flue gases to the air conditioning coils have been described as steam or hot water coils, it should be understood that the heating tubes may be of the fire tube type, the water tube type having been preferred in the one system which has been designed.

While the source of combustion gases has been described as being an oil burner, it should be understood that natural or artificial gas may be used or any other satisfactory heating medium, the use of the oil burner having been described merely because, in connection with one system which has been designed, it was calculated that the maximum results with minimum expense would be obtained through the use of oil because of the price differentials existing between it and other fuels.

While ammonia has been described as the refrigerant in the absorption refrigeration system illustrated, it should be understood that any other refrigerant suitable for use in an absorption plant may be used.

While the refrigeration apparatus has been described for use only in connection with air cooling coils for air conditioning purposes, it should be understood that all or a part of the refrigerant may be circulated through coils which may serve for the production of ice in, or the cooling of the space within what is known as the ordinary domestic refrigerator.

Whereas one embodiment of the invention has been described for the purpose of illustration, it should be understood that the invention is not limited to the details described, since many modifications may be made by those skilled in the art without departing from the spirit of the invention, after having access to this disclosure.

What is claimed is:

1. Air conditioning apparatus comprising a combustion chamber, means for producing hot gases in said chamber, a heating plant including means for heating water, an absorption refrigeration plant including means for heating a refrigerant, air heating coils associated with said heating plant, air cooling coils associated with said refrigeration plant, means for passing the air to be conditioned over said coils and into the space to be served, means responsive to temperature conditions for alternatively passing gasses from said chamber through said heating plant or through said refrigeration plant, and means also responsive to temperature conditions for controlling said first mentioned means.

2. Air conditioning apparatus comprising a combustion chamber, means for producing hot gases in said chamber, an absorption refrigeration unit, a generator in said unit, a plurality of fire tubes passing through said generator, means for heating water, thermostatically controlled means for routing the hot gases from said chamber through said fire tubes or in contact with said water heating means, air cooling coils through which the refrigerant from said unit is circulated, air heating coils associated with said means for heating water, and means for passing the air to be conditioned over said coils and for discharging it into the space to be served.

3. Air conditioning apparatus comprising a combustion chamber, means for producing hot gases in said chamber, an absorption refrigeration unit, a generator in said unit, a plurality of fire tubes passing through said generator, means for heating water, thermostatically controlled means for routing the hot gases from said chamber through said fire tubes or in contact with said water heating means, thermostatically controlled means for controlling said first mentioned means, air cooling coils through which the refrigerant from said unit is circulated, air heating coils associated with said means for heating water, and means for passing the air to be conditioned over said coils and for discharging it into the space to be served.

4. Air conditioning apparatus comprising an air conditioning compartment, heat exchange means in said compartment, a fan for passing the air to be conditioned through said compartment in heat exchange relationship to said means and for discharging it into the space to be served, a central source of heat, means utilizing heat from said source to energize the heating plant for supplying a heating medium to said compartment, or for energizing the refrigerating plant for supplying a refrigerant to said compartment, and thermostatically controlled means for controlling the energization of said heating plant from said source and the supply of heat to said compartment, or for controlling the energization of said refrigerating plant from said source and the supply of refrigeration to said compartment.

5. An air conditioning system comprising a central source of heat, air cooling apparatus, air heating apparatus, means for producing a refrigerating effect in a medium for supply to said air cooling apparatus or a heating effect for supply to said heating apparatus by heat from said source, means for selectively controlling said means and the operation of said air cooling apparatus, or the operation of said air heating apparatus, and thermostatically controlled means responsive to conditions within the space being served for controlling said apparatus to maintain a desired standard.

6. An air conditioning system comprising a central source of heat, air cooling apparatus, air heating apparatus, means for producing a refrigerating effect in a medium for supply to said air cooling apparatus or a heating effect for supply to said heating apparatus by heat from said source, thermostatically controlled means for selectively controlling said means for the operation of said air cooling apparatus, or for the operation of said air heating apparatus, and thermostatically controlled means responsive to conditions in the space being served for additionally controlling said air cooling apparatus or said air heating apparatus to maintain a desired standard in the space being served.

7. An air conditioning system comprising a central source of heat, air cooling apparatus, air heating apparatus, means for producing a refrigerating effect in a medium for supply to said air cooling apparatus or a heating effect for supply to said heating apparatus by heat from said source, means for selectively controlling the operation of said air cooling apparatus, or the operation of said air heating apparatus, thermostatically controlled means responsive to conditions in the space being served for controlling the operation of said air cooling apparatus or of said air heating apparatus after selection to maintain a desired standard in the space being served, and thermostatically controlled means exposed to outdoor conditions for adjusting said first mentioned thermostatically controlled means.

8. An air conditioning system comprising a central source of heat, air cooling apparatus, air heating apparatus, means for producing a refrigerating effect in a medium for supply to said air cooling apparatus or a heating effect for supply to said heating apparatus by heat from said source, means thermostatically controlled for selectively operating said air cooling apparatus, or for operating said air heating apparatus, thermostatically controlled means responsive to conditions in the space being served for controlling said air cooling apparatus or said air heating apparatus to maintain a desired standard in the space being served, and thermostatically controlled means exposed to outdoor conditions for adjusting said thermostatically controlled means.

BENJAMIN S. FOSS.